United States Patent [19]

Loewy et al.

[11] Patent Number: 5,366,176

[45] Date of Patent: Nov. 22, 1994

[54] FEEDBACK-STABILIZED AERODYNAMICALLY OVERBALANCED LIFTING/CONTROL SURFACE FOR AIRCRAFT

[75] Inventors: Robert G. Loewy, Loudonville, N.Y.; Wen-Liu Miao, Trumbull, Conn.

[73] Assignee: United Technologies Corp., Hartford, Conn.

[21] Appl. No.: 48,864

[22] Filed: Apr. 16, 1993

[51] Int. Cl.⁵ .............................................. B64C 9/10
[52] U.S. Cl. .............................. 244/75 R; 244/203; 244/82
[58] Field of Search ................ 244/75 R, 213, 215, 244/203, 201, 219, 82

[56] References Cited

U.S. PATENT DOCUMENTS

| | | | |
|---|---|---|---|
| 2,416,958 | 3/1947 | Sears | 244/203 |
| 2,575,532 | 11/1951 | Sears | 244/82 |
| 2,623,717 | 12/1952 | Price | 244/82 |
| 5,114,104 | 5/1992 | Cincotta et al. | 244/75 R |
| 5,222,699 | 6/1993 | Albach et al. | 244/219 |
| 5,224,826 | 7/1993 | Hall et al. | 416/4 |

Primary Examiner—Michael S. Huppert
Assistant Examiner—Anne E. Bidwell
Attorney, Agent, or Firm—William W. Jones

[57] ABSTRACT

An airfoil of an aircraft is provided with one or more control flaps which are pivotally mounted on the airfoil in an aeromechanically unstable manner. The trailing edges of the control flaps are provided with one or more control tab zones which include trailing portions that deform in response to application of electrical current, heat or pressure thereto. The pitch of the airfoil is constantly controlled by selectively deforming the control tab zones in response to measured signals indicative of variations in fluid pressure acting upon, or motion of the unstable control flaps. The impetus for moving the control system is thus derived from the air-stream through which the aircraft moves. The control system can also be utilized in watercraft, with the operating impetus being derived from the water stream through which the craft moves.

7 Claims, 5 Drawing Sheets

FEEDBACK-STABILIZED AERODYNAMICALLY OVERBALANCED LIFTING/CONTROL SURFACE FOR AIRCRAFT

TECHNICAL FIELD

This invention relates to a pitch control system for use in an aircraft or watercraft, and more particularly, to the use of fast acting deformable tab zones on the trailing edge of an air or water foil component of the craft made aeromechanically unstable deliberately to minimize the power required to provide such control.

BACKGROUND ART

Fixed wing aircraft controls typically take the form of secondary surfaces such as flaps which are hinged to the trailing or aft portion of a lifting or directional member on the aircraft. Such members may include ailerons; elevators; rudders; and the like on airplanes or missiles. The attitude control flaps are generally hinged to the wing or other member near the leading edge of the control flap so as to produce an aeromechanically stable wing/flap assembly relative to the remainder of the wing. Pressures exerted on the control flap by the airstream through which it moves will tend to hold the flap in its neutral position when hinged in this way. The orientation of the control flap relative to the remainder of the wing is changed by means of an hydraulic or pneumatic system which is operated by the pilot or autopilot. This tendency of the airstream to move the control flap to a stable neutral position occurs only when the flap is hinged to the wing at a location near the leading edge of the control flap.

In earlier days of aviation, before the hydraulic or pneumatic fluid power boost systems were available for aircraft, the control flaps on aircraft wings, for example, were effectively hinged to the wing at a location which was rearwardly offset from the flap leading edge —actually or in effect— so as to produce aerodynamic balance in the flaps, since pressures forward of the hinge line would tend to counteract pressures acting on the flap rearward of the hinge line. In such early prior art systems, too much aerodynamic balance had a tendency to cause the control flaps to be unstable in any fixed deflected position because the airstream impinging on the leading edge of the control flap tends to impart a further pivoting moment to the control flap which will tend to deflect the control flap out of whatever pivotal position it is in. To lessen the control forces required to move a stable hinge arrangement, the early prior art control flaps were often provided with trim tabs on their trailing edges, which tabs could be mechanically pivoted on the flaps so as to counteract the tendency of the airstream to return a deflected, stably hinged control surface to a neutral position. Trim tabs were set by the pilot by means of a slow acting actuator, such as a screw, or the like, so as to achieve a desired deflected position with zero or small pilot control force. The objective of either including trim tabs or the rearward offset of the control flap hinge line —or both— was to lessen the forces needed to pivot the control flaps, but in either case the prior art had to take care to make the control surface stable in the presence of the energetic airstream.

DISCLOSURE OF THE INVENTION

This invention relates to an air or water foil control assembly which involves the use of control flaps which are attached to the airfoils or a surface which rotates in its entirety, but in all cases, that are designed deliberately to be aeromechanically unstable.

The trailing edges of these control surfaces are provided with one or more deformable tab zones which are disposed along the trailing edge of the control flap, and which are directly impinged by the airstream. The deformable tab zones will deform so as to automatically alter the pitch of such zones relative to the airstream flow, and the degree of deformation and its time relationship to the motion will be such as to stabilize the airfoils it is attached to. The tab zones may include a material which is strain-actuated, and which is embedded proximal to the trailing edge of the control surface. The strain-actuated material may be a piezoelectric material; a thermally sensitive material; a shape memory alloy; or some other material which reacts to mechanisms imparting command signals to the tabs.

A microprocessor or analog controlled feedback monitor is included in the system of this invention. The feedback control may include motion sensors which monitor flap motion, and which sensors are operably connected to the control processor to relay data regarding control surface pitch to the microprocessor.

The processor constantly receives actual wing pitch information from the motion sensors. The controller constantly compares the desired pitch and the actual pitch to determine any differences, anytime that a predetermined degree of Δ or error is detected, the controller will actuate the tabs to take corrective action. Thus the control system serves to maintain substantially pitch corresponding to pilot instructions, which depend on the flight conditions of the aircraft.

It is therefore an object of this invention to provide a control surface for use on an aircraft or watercraft, having a deliberately aeromechanically unstable characteristic, and automatically operating stabilizing trim tabs disposed on the control member to provide motions desired by the pilot.

It is a further object of this invention to provide a lifting/control surface of the character described having a control system for monitoring control surface pitch and issuing trim tab pitch correction signals in predetermined or real-time measured situations.

It is another object of this invention to provide a foil member of the character described wherein the trim tabs are formed of controlled deformable materials.

It is an additional object of this invention to provide a foil member of the character described for use in fixed and/or rotary wing aircraft, and/or in guided missiles, and/or in watercraft.

It is yet another object of this invention to provide a foil member of the character described which has control and stabilizing systems requiring low operating power relative to prior art aircraft or watercraft controls.

These and other objects and advantages of the invention will become more readily apparent from the following detailed description of an embodiment thereof when taken in conjunction with the accompanying drawings, in which:

BRIEF DESCRIPTION OF THE DRAWINGS

Referring now to FIGS. 1–5, there is shown an embodiment of the invention which is adapted for use with an airfoil in the form of a wing 2 on a fixed wing aircraft. The wing 2 has a control flap 4 pivotally mounted near its trailing edge, which flap 4 is used to control and vary the overall angle of attack of the wing 2 relative to the oncoming airstream. The control flap 4 is hinged to the wing 2 about pivot axis 5 which is rearward of the conventional control flap-to-wing pivot axis location 8. The control flap pivot axis 5 is located close to, or behind the center of aerodynamic pressure of the control flap 4, which is typically located rearwardly of the leading edge of the control flap 4 by about one-quarter of total length of the flap 4. This hinge location renders the control flap 4 statically unstable, or marginally unstable in rotational motion above a predetermined forward speed, which speed is proportional to the stiffness of the mechanical restraint system which applies an elastic restoring movement to the control flap tending to keep it in its unrotated position.

Figure 1:
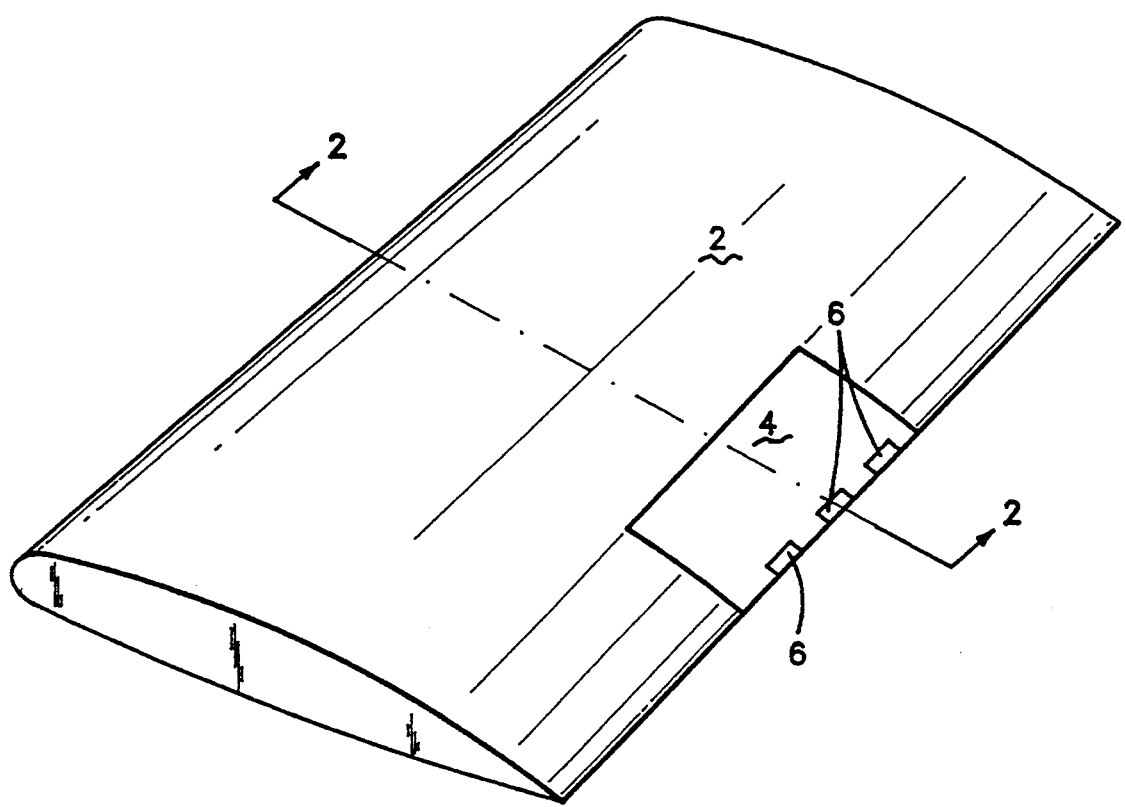
FIG. 1 is a fragmented perspective view of a typical fixed wing aircraft wing which is provided with the control system of this invention.
Figure 2:
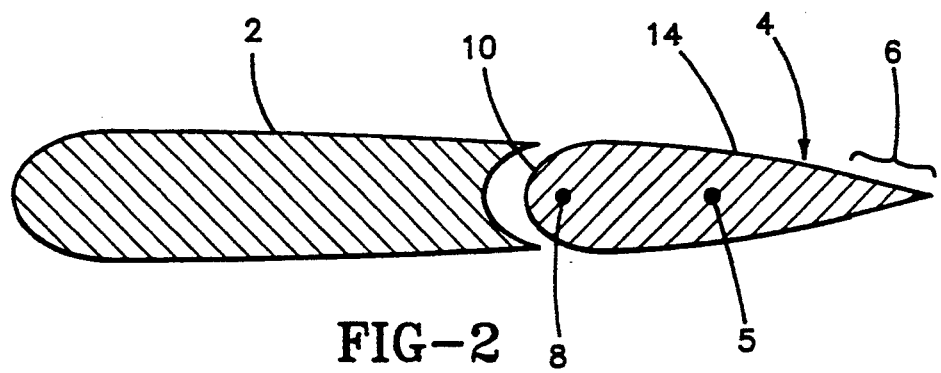
FIG. 2 is a sectional view of the wing taken along line 2—2 of FIG. 1.
Figure 6:
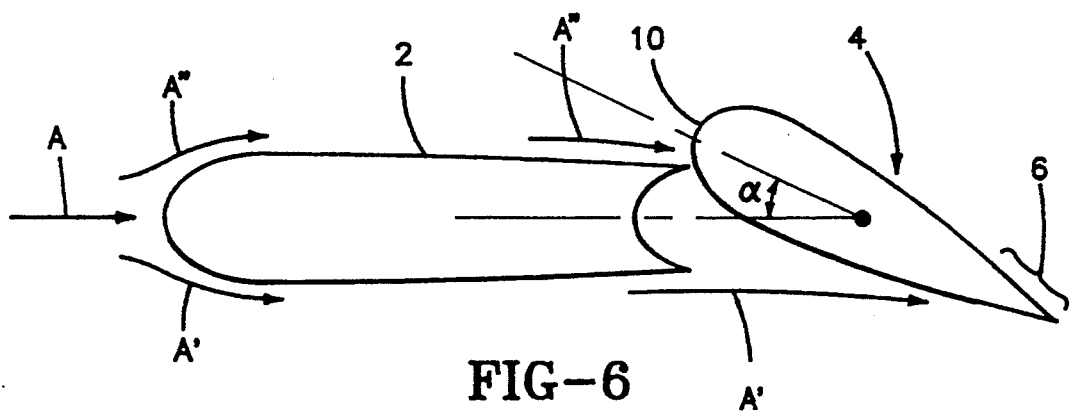
FIG. 6 is a view similar to FIG. 2 but showing the control flap rotated out of its neutral position.

It will be appreciated that once the control flap 4 is rotated either clockwise or counterclockwise out of its neutral position, its leading edge 10 will be impinged to varying degrees by the oncoming airstream, which will then try to rotate the flap 4 even further out of its neutral position, thus rendering the control flap 4 aeromechanically unstable when operating above its critical airspeed in any rotational position which deviates from the neutral position. This condition allows one to make use of the oncoming airstream to provide a significant proportion of the energy needed to pivot the control flap 4 to a position desired to alter the angle of attack of the wing 2 relative to the oncoming airstream. Thus, the oncoming airstream assists in producing gross pivotal motion of the control flaps 4 to the pitch positions desired by the pilot, because the oncoming airstream renders the control flaps 4 aerodynamically unstable any time that they are offset from their neutral positions relative to the remainder of the wing 2. In order to keep this control flap instability manageable, trim tab zones 6 are provided on the trailing edge of the control flaps 4 which are driven according to signals from a feedback control system.

The trim tab zones 6 are preferably integral extensions of the control flap skin 14 which are formed from a selectively deformable material that is fastened or fused to the flap skin 14. The tab zones or tabs 6 may include outermost deformable material layers 16 and 18, and inner substrate layers 20 and 22 respectively, which inwardly abut the deformable layers 16 and 18. A control core 24 such as "honeycomb" or plastic foam may be used to complete the tab 6. The tabs 6 are thus likely to be laminated structures. The substrate layers 20 and 22 merely support the deformable layers 16 and 18. The substrates 20 and 22 are preferably made from structural material, as, for example aluminum.

Figure 3:
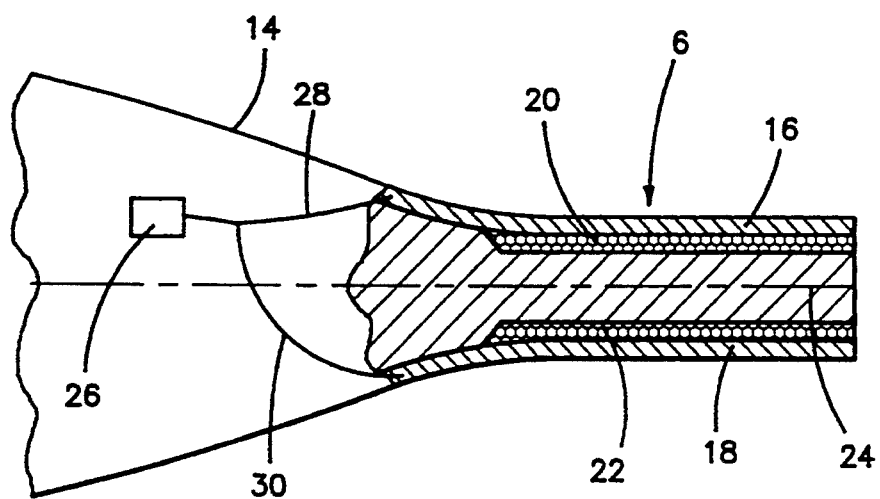
FIG. 3 is a fragmented sectional view of one of the tabs on the wing showing the tab in a first pitch position.
Figure 4:
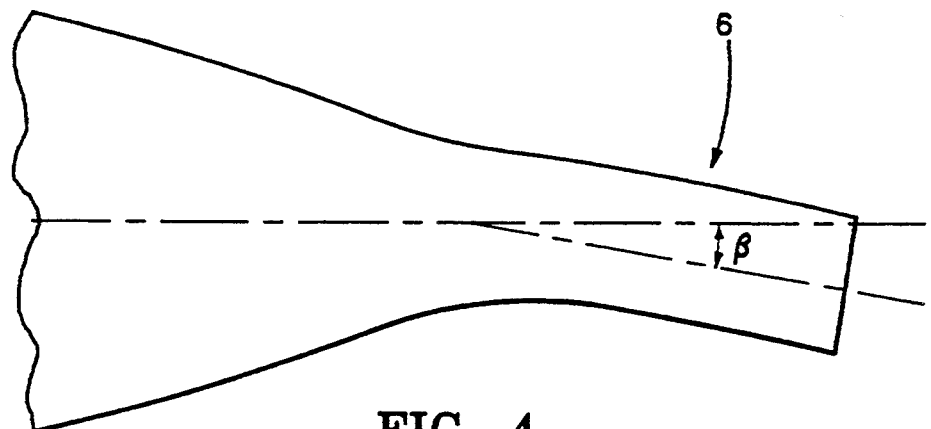
FIG. 4 is a view similar to FIG. 3 but showing the tab deflected to a different pitch position.

The deformable layers 16 and 18 can be formed from a piezoelectric material such as a piezoceramic material sold by Piezoelectric Products, Inc. under the product name G-1195 which, when subjected to an electrical current will predictably expand or contract according to the sign of the voltage and to a degree proportional to the magnitude of the voltage applied thereto. A current generator or battery 26 may be connected to the layers 16 and 18 via conductors 28 and 30 to supply the necessary power through voltage varying devices as described hereinafter to operate the layers 16 and 18. The power source 26 will provide a biased charge at a predetermined voltage to the piezoelectric layers 16 and 18 when the latter are in a neutral, nondeflected position. The voltage can be selectively increased or decreased or have its sign changed, depending on which direction the layers 16 and 18 are to be deflected. FIGS. 3 and 4 show that, in the case of piezoelectric actuation layers, differential voltages are applied to vary the strains of layers 16 and 18 in opposite directions. FIG. 3 shows the tab 6 in its neutral position, and FIG. 4 illustrates a downwardly deflected position of the tabs 6 as a result of the differential strains.

Figure 5:
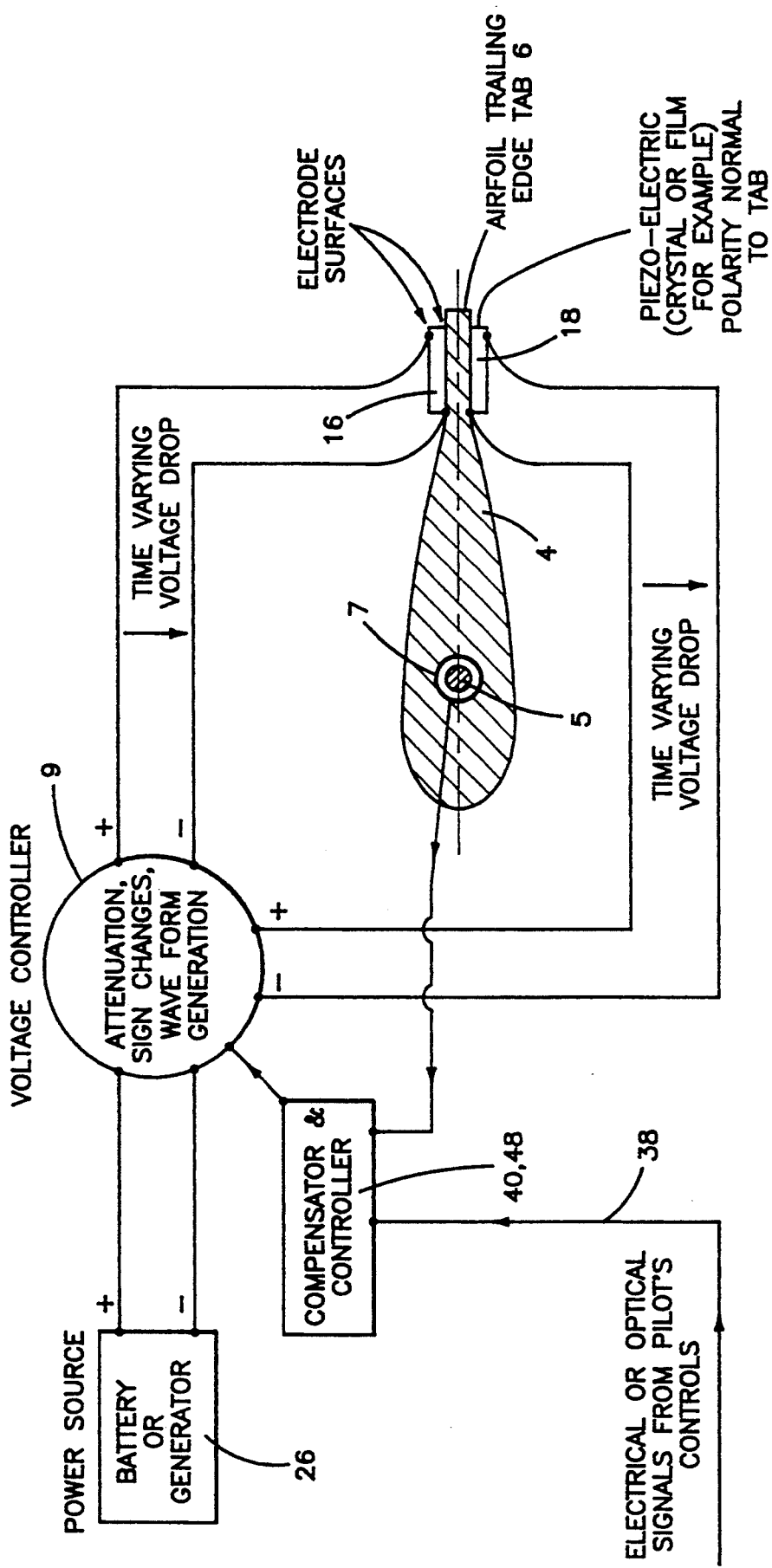
FIG. 5 is a circuit diagram of a circuit for operating the control tabs.

Referring now to FIG. 5, a schematic representation of the tab deflecting system is shown. As previously noted, a battery or generator 26 provides the necessary power to operate the piezoelectric elements 16 and 18. The control flap 4 is fixed to a rotational axle 5 whose rotational position is constantly monitored by a rotation transducer 7 mounted in the fixed portion of the wing 2. The transducer 7 thus constantly sends measured flap rotational position signals to the compensator/controller 40, 48, which also receives desired pilot flap position signals, or commands, through the line 38. The signals from the transducer 7 identify the measured, or actual angle of flap deflection ($\alpha_m$); and the signals from line 38 identify the desired angle of flap deflection ($\alpha_d$) which is sought by the pilot. Error signals from the compensator/controller 40, 48 which signify that $\alpha_m$ and $\alpha_d$ differ, or do not differ, are sent to a voltage controller 9 which will alter the voltage supplied to the respective piezoelectric elements 16 and 18, if necessary. When $\alpha_d$ and $\alpha_m$ are equal, the voltage controller 9 will serve to maintain the extant voltage to the elements 16 and 18 so as to retain the existing tab deflection angle $\beta$.

A brief description of the operation of a typical arrangement of implementing components of a system for illustrative purposes is as follows. Assume that a pilot signal is given with the objective of pivoting the control flaps 4 through a known angle $\alpha$ to change the angle of attack, or pitch, of the overall wing 2 relative to the oncoming airstream A. The airstream A divides into over-and-under-wing components A'' and A' respectively. The feedback controller receives a signal indicating that the condition which the pilot-desires does not exist. The controller causes the power source 26 to then provide a differential voltage to the tab actuators 16 and 18, which bend the tab 6 into the underwing airstream component A' and this makes the control flap 4 rotate. The over-wing component A'' impinges on the leading edge 10 of the control flap 4 and imposes a pivot moment to the flap 4 which tends to pivot the control flap 4 beyond the desired angle $\alpha$. This, too, is sensed by the flap motion sensor such as the potentiometer shown in FIG. 5 which provides a correcting signal to the feedback controller. Corrective voltages are then sent to the tabs 6 on the trailing edge of the control flap 4 and they are moved so as to provide the desired action of the flap 4.

In certain applications, with changing airspeed or density, there will be a need to supply a compensating signal to be able to maintain the desired angle for the control flap deflection. Such compensating signals may be preprogrammed and based on airspeed signals from a conventional airspeed detector, for example. When the proper tab deflection angle $\beta$ has been reached, the control flap 4 will become stabilized at the deflection angle $\alpha$, and the clockwise pivotal moment imposed on the flap nose 10 by the airstream component A" will be nullified by an equal and opposite counterclockwise pivotal moment imposed on the control surface 4 by the deflected tabs 6 as a result of pressures generated by the airstream components A'.

Figure 7:
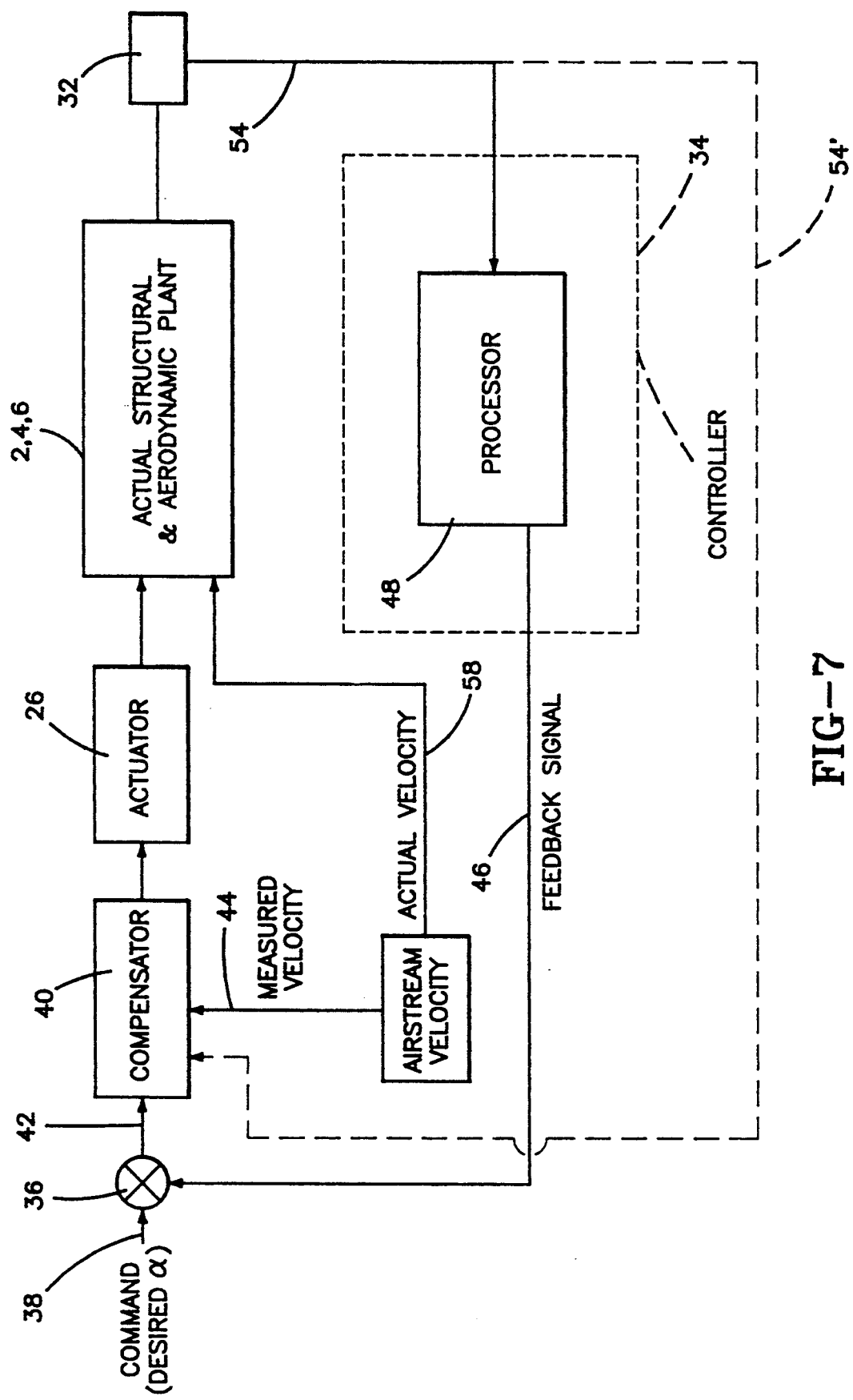
FIG. 7 is a schematic block diagram of a control system for use in the invention.
Figure 8:
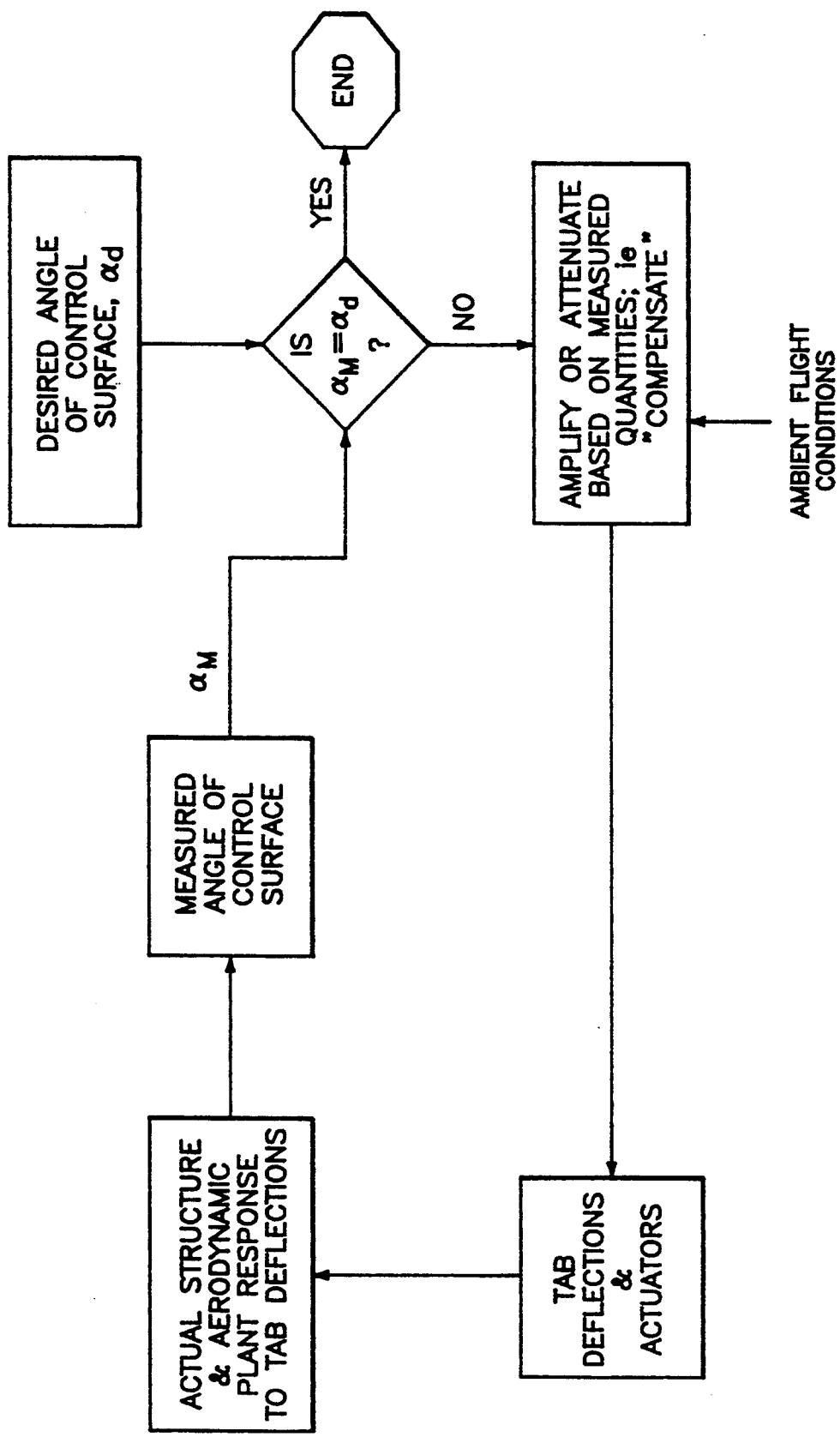
FIG. 8 is a flowchart of the software used to operate the control system of FIG. 6.

Referring now to FIGS. 7 and 8, details of a typical control system are shown. The controller is designated generally by the numeral 34. Pilot commands reach a first summing junction 36 through a transmission line 38. The incoming pilot signal may be modified in the summing junction 36, as explained hereinafter, and then is transmitted through a compensator 40 through line 42. The compensator 40 is a device which amplifies or attenuates the control signal from line 42 to account for changes in airspeed; air density; measured control flap angle ($\alpha_m$); or the like. The compensator 40 normally operates in an open loop manner, and receives current aircraft velocity or airstream pressure signals through line 44 and through line 54'. These signals change the way the compensator 40 modifies the command signal received through line 42, which it then re-transmits. To produce the modified command signal, the summing junction 36 also receives a feedback signal through line 46 from the processor 48 in the controller 34. The feedback signal is derived from the measured flap position angle $\alpha_m$. The measured flap position feedback signal $\alpha_m$ is also fed both directly to the processor 48 through a line 54 from the flap position sensor 7. The $\alpha_m$ signal from line 54 to the processor 48 is modified by the processor 48 and then fed through line 46 to the summing junction 36.

The processor 48 thus receives signals from the sensors 32. The processor 48 utilizes these incoming signals from lines 50 and 54 to predict how the pilot input signal should be changed to reduce the difference between desired and actual control surface deflection to zero. As previously noted, this modification of the pilot's signal 42 is produced by the summing junction 36, and is used to produce a modified signal transmitted to the compensator 40 through the line 42. The processor 48 constantly modifies its output signal as input signals to it change. The controller 24 could be a digital microprocessor or analog device which provides desired control signals to achieve such overall system characteristics as stability, quick response, low overshoot, minimum oscillation, and the like. The compensator 46 can be pre-programmed based on theoretical predictions which assume knowledge of many of the characteristics of the total system.

Figure 9:
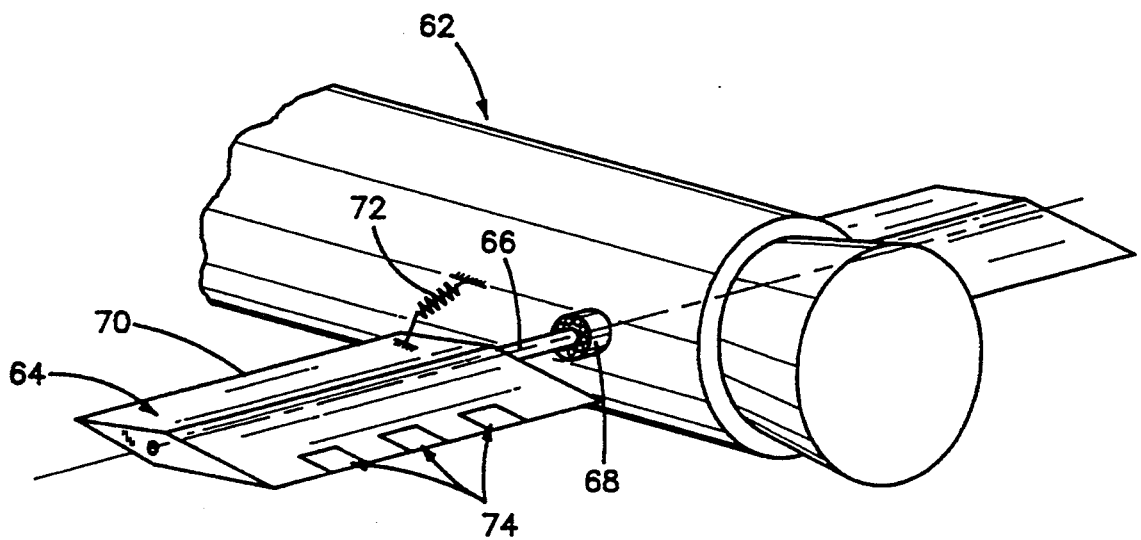
FIG. 9 is a schematic representation of an embodiment of the invention adapted for use in connection with missile guidance fins.

Referring to FIG. 9, a variation of this invention is shown which is adapted for use in a rocket or missile guidance system. The missile is identified generally by the numeral 62 and includes a plurality of guidance fins 64 which are pivotally mounted on the missile 62 via axles 66 which are fixed to the fins 64 and mounted in bearings 68 which are in turn mounted on the missile 62. The pivot axis of the fins 64 is offset rearwardly from their aerodynamic centers, i.e., one-quarter of the fin length rearwardly of the leading edge 70 thereof. A pivot restraint 72 in the form of a coil spring is attached to the fin 64 and the missile body to control pivotal movement of the fins 64 relative to the missile 62. A plurality of the control tabs 74 are mounted on the trailing edge of the fins 64. Fin deflection on the axle 66 is initiated and controlled by selective deflection of the tabs 74. The tabs 74 may include deflectable piezoelectric layers, and will be controlled by a system comparable to the previously described control system.

It will be readily appreciated that the foil pitch control assembly of this invention with its inherent instability, and the control tabs can eliminate the hydraulic or pneumatic high boost flight control systems in appropriate cases, or can be used in conjunction with lower power fluid controls. The control tabs are preferably made from controllably deformable materials, but could include suitably quick response electric tab control motors. While deformable piezoelectric layers have been specifically described, it will be understood that other materials could also be used such as shape memory alloys which will move from one state to another when variable temperatures are applied. Thermally strained composites can also be used as a component of the tabs. Tab operating power in the form of electrical current or heat can be supplied to the deformable components. Flight control signals can be provided to electro-optical transducers at the control surface by fiber optics running thereto from the cockpit, and tab stabilization and error minimization can be carried out locally by dedicated hard-wired microprocessors or analog devices. While the air foils specifically described in connection with this invention are wings on fixed wing aircraft, and fins on missiles, it will be readily appreciated that the control tab/foil structure also has utility as a movable wing component of an aircraft, i.e., as a helicopter rotor blade whose angle of attack is dependent on the pivotal position of the tab or tabs thereon. In the latter case, of course, the control system used would have to take into account the nature of helicopter rotor movement.

Since many changes and variations of the disclosed embodiment of the invention may be made without departing from the inventive concept, it is not intended to limit the invention otherwise than as required by the appended claims.

What is claimed is:

1. A control system for use in controlling the direction of movement of a craft through an oncoming fluid stream, said control system comprising a control member mounted on the craft for rotational movement relative to the oncoming fluid stream about a hinge line which renders the control member substantially mechanically unstable when rotated to any position angularly offset from a reference neutral position relative to the direction of flow of the oncoming fluid stream, said control member having a rounded leading edge facing into the oncoming fluid stream, and a tapered trailing edge, said trailing edge being provided with at least one tab zone therein which will deform when subjected to electrical energy and which is operable, when deformed, to alter the angle of attack of the control member relative to the oncoming fluid stream; means for measuring an actual angle of deflection of said control member away from said neutral position; and electrical energy control means operably connected to said means for measuring, said electrical energy control means being operable to selectively vary the electrical energy applied to said tab zone in response to variations in the actual control member angle of deflection.

2. The control system of claim 1 wherein said tab zone includes deformable layers thereof which will selectively bend when subjected to energy from an electric current.

3. The control system of claim 2 wherein said control member is a control flap mounted on an air foil on an aircraft.

4. The control system of claim 3 wherein said deformable layers include piezoelectric materials which will selectively deform when subjected to varying voltage.

5. The control system of claim 3 wherein said control flap is mounted on a hinge line which is spaced apart from said leading edge thereof approximately one-quarter of the distance between said leading edge and said trailing edge thereof.

6. The control system of claim 5 further comprising a source of electrical current operably connected to said deformable layers for supplying voltage thereto.

7. A control system for use in controlling the angle of attack of an air foil relative to an oncoming airstream, said system comprising:

a) a control flap mounted on said air foil, said control flap having a leading edge for facing into the oncoming airstream, and a trailing edge distal of said leading edge, said control flap being rotatably connected to said air foil about a hinge line which is interposed between said leading and trailing edges, and offset from said leading edge approximately one-quarter of the distance between said leading and trailing edges to render said control flap substantially aeromechanically unstable in the oncoming airstream when rotated out of a reference neutral position relative to said air foil;

b) tab means on said trailing edge of said control flap, said tab means including selectively deformable components therein which will selectively bend relative to the oncoming air stream in response to application of varying amounts of electrically derived energy so that controlled deformation of said components will deflect said tab means to alter the overall leading-to-trailing edge profile of the control flap;

c) energy generating means for providing the electrically-derived energy to said deformable components;

d) means for measuring angles of rotation of the flap relative to said neutral position and emitting signals indicative of said angles of rotation;

e) means for carrying signals indicative of desired angles of flap rotation relative to said neutral position; and f) controller means for receiving and comparing said measured angle signals with said desired angle signals said controller means being operably connected to said energy generating means for selectively actuating the latter whenever said signals indicate a difference between the measured and desired angles of flap rotation, to selectively deform said deformable tab means components so as to reduce any differences between measured and desired angles of flap deflection.

* * * * *